United States Patent
Yang

(10) Patent No.: US 10,015,513 B2
(45) Date of Patent: Jul. 3, 2018

(54) IMAGE PROCESSING APPARATUS AND IMAGE PROCESSING METHOD THEREOF

(71) Applicant: HIMAX TECHNOLOGIES LIMITED, Tainan (TW)

(72) Inventor: Der-Wei Yang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 166 days.

(21) Appl. No.: 15/148,463

(22) Filed: May 6, 2016

(65) Prior Publication Data

US 2017/0324974 A1    Nov. 9, 2017

(51) Int. Cl.
*H04N 7/12* (2006.01)
*H04N 11/02* (2006.01)
*H04N 11/04* (2006.01)
*H04N 19/513* (2014.01)
*H04N 19/527* (2014.01)
*H04N 19/174* (2014.01)

(52) U.S. Cl.
CPC ......... *H04N 19/513* (2014.11); *H04N 19/174* (2014.11); *H04N 19/527* (2014.11)

(58) Field of Classification Search
CPC ... H04N 19/513; H04N 19/174; H04N 19/527
USPC .................................................... 375/240.16
See application file for complete search history.

(56) References Cited

U.S. PATENT DOCUMENTS

| | | | |
|---|---|---|---|
| 8,259,225 B2 | 9/2012 | Chappalli et al. | |
| 8,289,444 B2 | 10/2012 | Zhou et al. | |
| 2010/0045856 A1* | 2/2010 | Chappalli | H04N 5/145 348/441 |
| 2014/0056354 A1* | 2/2014 | Chen | H04N 7/0147 375/240.16 |
| 2014/0376624 A1* | 12/2014 | Li | H04N 19/159 375/240.12 |
| 2015/0201206 A1* | 7/2015 | Leontaris | H04N 19/597 375/240.25 |

FOREIGN PATENT DOCUMENTS

EP    1641278    3/2006

OTHER PUBLICATIONS

"Office Action of Taiwan Counterpart Application", dated Aug. 31, 2016, p. 1-p. 6, in which the listed references were cited.

* cited by examiner

*Primary Examiner* — Jared T Walker
(74) *Attorney, Agent, or Firm* — J.C. Patents

(57) ABSTRACT

An image processing apparatus and an image processing method thereof are provided. A shared storage unit of a motion estimation and motion compensation apparatus captures frame data of a storage unit through a bus. A motion vector estimation unit and a motion compensation unit capture image data for executing a motion vector estimation operation and a motion compensation operation from the sharing storage unit.

13 Claims, 3 Drawing Sheets

IMAGE PROCESSING APPARATUS AND IMAGE PROCESSING METHOD THEREOF

BACKGROUND OF THE INVENTION

1. Field of the Invention

The invention relates to an electronic apparatus, and particularly relates to an image processing apparatus and an image processing method thereof.

2. Description of Related Art

To increase the image resolution to make the image clearer and reduce the discontinuity and blur of the image, technologies such as motion adaptive deinterlacing and motion compensated deinterlacing are commonly used to increase the resolution of the vertical part of a motion image through interlaced scanning. Also, in recent years, the technology of motion interpolation is also used to increase the frame rate. By adopting the technology of motion interpolation, a motion trajectory (i.e., a motion vector) of a moving object in adjacent frames can be estimated, so as to calculate and interpolate new pixel data and an interpolated frame, thereby effectively increasing frame fields displayed per second and effectively retaining the resolution in the vertical direction. In this way, the motion in the image may become more smooth and clear, so the viewer may not sense jumping of the frames, and the discontinuity of motion and blur of the image can be suppressed.

According to the technology of motion interpolation, a plurality of motion vectors are used to capture corresponding pixel data, and the pixels are mixed to form the interpolated frame. However, such technology relies on a greater frame memory bandwidth.

SUMMARY OF THE INVENTION

The invention provides an image processing apparatus and an image processing method capable of effectively reducing a memory bandwidth required for motion interpolation.

An image processing apparatus according to an embodiment of the invention includes a storage unit and a motion estimation and motion compensation apparatus. The storage unit receives and stores sequential image data. The motion estimation and motion compensation apparatus is coupled to the storage unit and performs motion estimation and motion compensation on the sequential image data to generate a plurality of interpolated frames. The motion estimation and motion compensation apparatus includes a shared storage unit, a motion vector estimation unit, a halo detection unit, and a motion compensation unit. The shared storage unit is coupled to the storage unit and captures image data of a $(t-1)^{th}$ frame and image data of a $(t-2)^{th}$ frame from the storage unit through a data bus, wherein t is an integer greater than 2. The motion vector estimation unit is coupled to the shared storage unit, receives image data of a $t^{th}$ frame, captures the image data of the $(t-1)^{th}$ frame from the shared storage unit, and performs a motion vector estimation operation based on the image data of the $t^{th}$ frame and the image data of the $(t-1)^{th}$ frame, so as to obtain motion vector distribution information. The halo detection unit is coupled to the motion vector estimation unit, and determines a halo defect position of each of the interpolated frames based on the motion vector distribution information. The motion compensation unit is coupled to the motion vector estimation unit and the halo detection unit, captures the image data of the $(t-1)^{th}$ frame and the image data of the $(t-2)^{th}$ frame from the shared storage unit, and performs a motion compensation operation based on the motion vector distribution information, the image data of the $(t-1)^{th}$ frame and the image data of the $(t-2)^{th}$ frame, so as to generate the interpolated frames between the $(t-1)^{th}$ frame and the $(t-2)^{th}$ frame.

According to an embodiment of the invention, the motion vector estimation unit and the motion compensation unit synchronously perform the motion vector estimation operation and the motion compensation operation by using a slice of an image frame as an unit.

According to an embodiment of the invention, the shared storage unit captures the image data of the $(t-2)^{th}$ frame by down-sampling, such that the motion compensation unit captures the image data of the down-sampled $(t-2)^{th}$ frame from the shared storage unit.

According to an embodiment of the invention, the motion compensation unit further performs a halo compensation operation based on the image data of the down-sampled $(t-2)^{th}$ frame, so as to compensate the halo defect of each of the interpolated frames.

According to an embodiment of the invention, the image data of the $t^{th}$ frame are down-sampled image data.

According to an embodiment of the invention, the image processing apparatus further includes a pre-processing unit. The pre-processing unit is coupled to the storage unit and the motion vector estimation unit and performs an image pre-processing operation on input image data, so as to generate the sequential image data.

According to an embodiment of the invention, the storage unit is a dynamic random access memory, and the shared storage unit is a static random access memory.

In an image processing method for an image processing apparatus according to an embodiment of the invention, the image processing apparatus includes a storage unit and a motion estimation and motion compensation apparatus. The motion estimation and motion compensation apparatus includes a shared storage unit. the image processing method for the image processing apparatus includes steps as follows. Sequential image data are stored in the storage unit. Image data of a $(t-1)^{th}$ frame and image data of a $(t-2)^{th}$ frame are captured from the storage unit through a data bus, wherein t is an integer greater than 2. Image data of a $t^{th}$ frame are captured, and the image data of the $(t-1)^{th}$ frame are captured from the shared storage unit. A motion vector estimation operation is performed based on the image data of the $t^{th}$ frame and the image data of the $(t-1)^{th}$ frame, so as to obtain motion vector distribution information. The motion vector distribution information is provided to determine halo defect positions of a plurality of interpolated frames. The image data of the $(t-1)^{th}$ frame and the image data of the $(t-2)^{th}$ frame are captured from the shared storage unit. The motion compensation operation is performed based on the motion vector distribution information, the image data of the $(t-1)^{th}$ frame, and the image data of the $(t-2)^{th}$ frame, so as to generate the interpolated frames between the $(t-1)^{th}$ frame and the $(t-2)^{th}$ frame.

According to an embodiment of the invention, the image processing method for the image processing apparatus includes performing the motion vector estimation operation and the motion compensation operation by using a slice of an image frame as an unit.

According to an embodiment of the invention, the image processing method for the image processing apparatus further includes capturing the image data of the $(t-2)^{th}$ frame from the storage unit by down-sampling as basis for performing the motion compensation operation.

According to an embodiment of the invention, the image processing method for the image processing apparatus includes performing a halo compensation operation based on the image data of the down-sampled $(t-2)^{th}$ frame, so as to compensate for a halo defect of each of the interpolated frames.

According to an embodiment of the invention, the image processing method for the image processing apparatus further includes performing an image pre-processing operation on input image data to generate the sequential image data.

According to an embodiment of the invention, the storage unit is a dynamic random access memory, and the shared storage unit is a static random access memory.

Based on above, in the embodiment of the invention, the motion estimation and motion compensation apparatus captures the frame data of the storage unit through the bus by the shared storage unit, then the motion vector estimation unit and the motion compensation unit capture the frame data required for the motion vector estimation operation and the motion compensation operation from the shared storage unit. Accordingly, the bus bandwidth required between the motion estimation and motion compensation apparatus and the storage unit when the motion vector estimation operation and the motion compensation operation are performed may be reduced. Also, the memory bandwidth required for the technology of motion interpolation may be reduced as well. Furthermore, the storage space requirement of the motion estimation and motion compensation apparatus may also be reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
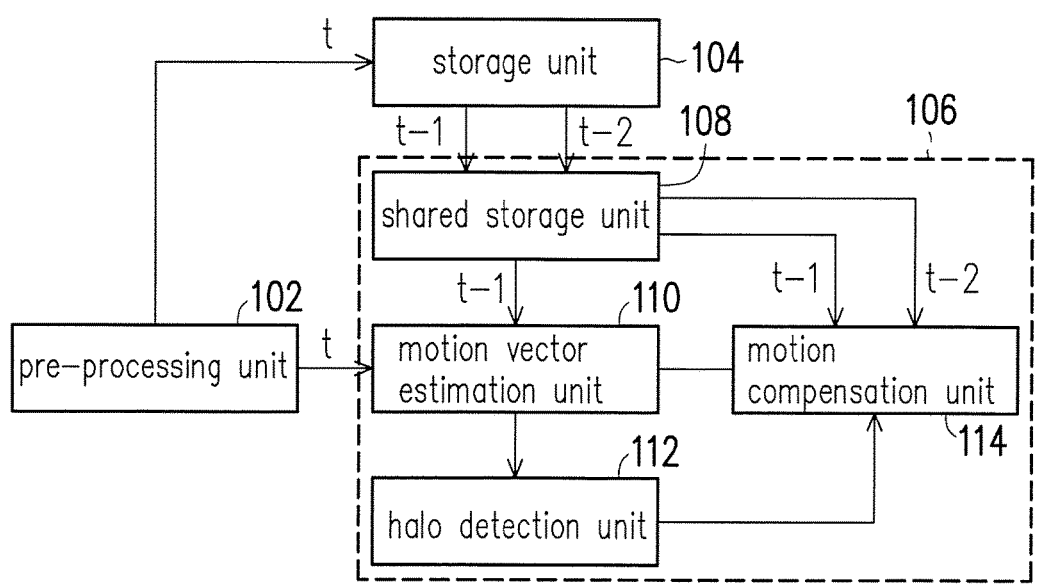
FIG. 1 is a schematic view illustrating an image processing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating an image processing apparatus according to an embodiment of the invention. Referring to FIG. 1, an image processing apparatus 100 includes a pre-processing unit 102, a storage unit 104, and a motion estimation and motion compensation apparatus 106. The motion estimation and motion compensation apparatus 106 is coupled to the pre-processing unit 102 and the storage unit 104. The pre-processing unit 102 is adapted to receive input image data and perform an image pre-processing process, such as an image compression process, an edge detection process, etc., on the image data, so as to generate sequential image data. The storage unit 104 may be implemented as a dynamic random access memory (e.g., double data rate (DDR) dynamic random access memory), for example, and the motion estimation and motion compensation apparatus 106 may be implemented as a chip, for example. However, the invention is not limited thereto. The storage unit 104 is adapted to store the sequential image data from the pre-processing unit 102. The motion estimation and motion compensation apparatus 106 is adapted to perform motion estimation and motion compensation on the sequential image data, so as to generate a plurality of interpolated frames. More specifically, the motion estimation and motion compensation apparatus 106 includes a shared storage unit 108, a motion vector estimation unit 110, a halo detection unit 112, and a motion compensation unit 114. Here, the shared storage unit 108 is coupled to the storage unit 104, the motion vector estimation unit 110, and the motion compensation unit 114. The motion vector estimation unit 110 is further coupled to the halo detection unit 112 and the motion compensation unit 114, and the halo detection unit 112 is further coupled to the motion compensation unit 114.

The shared storage unit 108 may be implemented as a static random access memory, for example, such as a line register. However, the disclosure is not limited thereto. The shared storage unit 108 may capture image data of a $(t-1)^{th}$ frame and image data of a $(t-2)^{th}$ frame from a storage unit 104 through a data bus, wherein t is an integer greater than 2. Here, t is a positive integer greater than 1. The motion vector estimation unit 110 may capture the image data of a $(t-1)^{th}$ frame from the shared storage unit 108 and perform a motion vector estimation operation based on image data of a $t^{th}$ frame and the image data of the $(t-1)^{th}$ frame, so as to obtain motion vector distribution information. The halo detection unit 112 may determine a halo defect position of each of the interpolated frames based on the motion vector distribution information, so as to inform the motion compensation unit 114 of an area that requires halo compensation in the interpolated frames.

Figure 2:
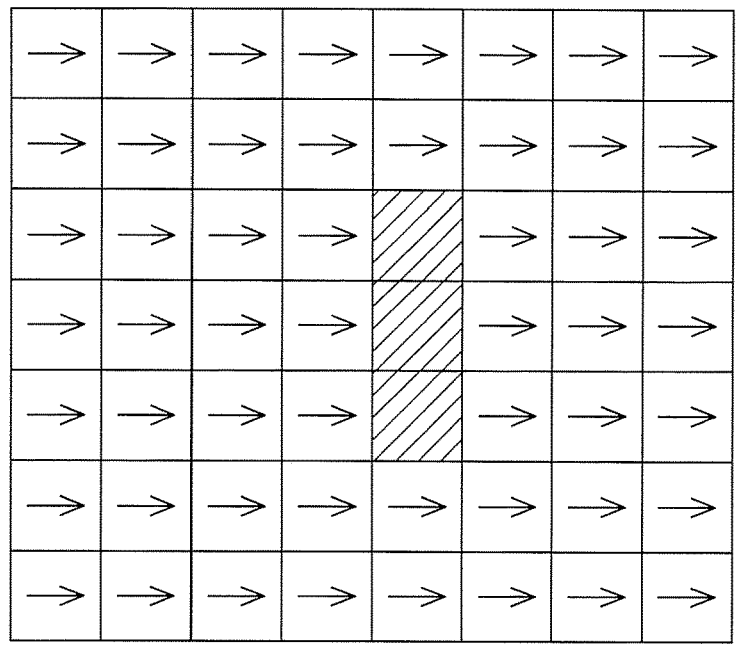
FIG. 2 is a schematic view illustrating a motion vector distribution corresponding to motion vector distribution information according to an embodiment of the invention.

For example, FIG. 2 is a schematic view illustrating a motion vector distribution corresponding to motion vector distribution information according to an embodiment of the invention. Referring to FIG. 2, in this embodiment, the number of image blocks selected by the motion vector estimation unit 110 is 8×7, for example. Namely, eight columns of blocks in the horizontal direction are selected, and seven rows of blocks in the vertical direction are selected as an image area for motion vector estimation. However, the invention is not limited thereto. Here, an arrow in each block may refer to an overall direction and size of a corresponding motion vector. The halo detection unit 112 may determine whether the motion vectors in the respective image blocks indicate the same direction. If the directions of the motion vectors in the image block are disordered, it is indicated that the image block (e.g., the image blocks marked with oblique lines in FIG. 2) has no corresponding frame data in adjacent frames where frame interpolation is performed. Thus, this area requires halo compensation.

Figure 3:
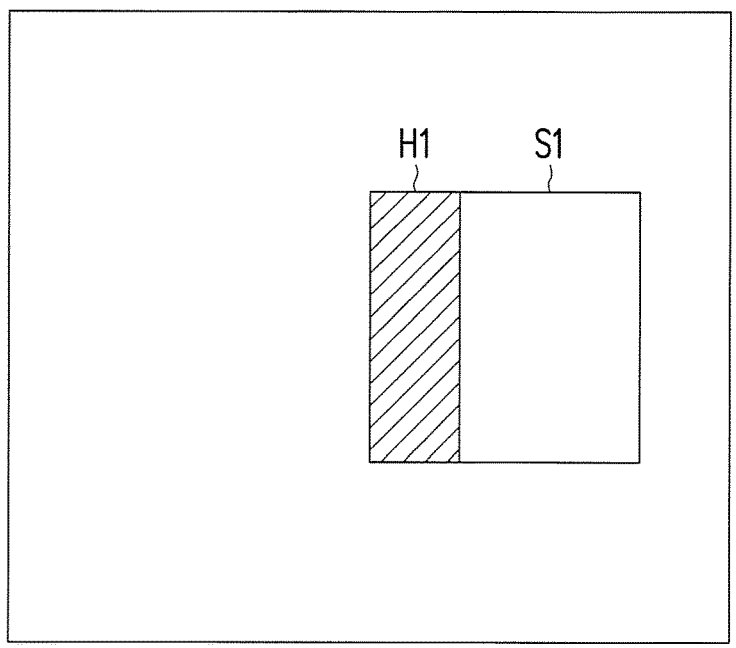
FIG. 3 is a schematic view illustrating an interpolated frame according to an embodiment of the invention.

FIG. 3 is a schematic view illustrating an interpolated frame according to an embodiment of the invention. Referring FIG. 3, a relation between positions in a preceding and a following frames where frame interpolation is performed indicates a rightward movement. As shown in FIG. 3, only a portion of the frame data of an image object S1 in the interpolated frame is available in the preceding and following frames, whereas no corresponding frame data in the part (i.e., the portion of the area marked with oblique lines in FIG. 3) of a halo defect area H1 is available in the preceding and following frames. Thus, this part of the frame requires halo compensation. Here, a location where the halo detect area H1 is distributed may be found out by analyzing the motion vector distribution provided in the motion vector distribution information of FIG. 2.

The motion compensation unit 114 may capture the image data of the $(t-1)^{th}$ frame and the image data of the $(t-2)^{th}$ frame from the shared storage unit 108, perform the motion compensation operation based on the motion vector distribution information, the image data of the $(t-1)^{th}$ frame and the image data of the $(t-2)^{th}$ frame, so as to generate the interpolated frames between the $(t-1)^{th}$ frame and the $(t-2)^{th}$ frame. Here, when the motion compensation unit 114 performs halo compensation on the interpolated frames, the halo compensation operation may be performed based on the image data of the $(t-2)^{th}$ frame, for example.

More specifically, in this embodiment, the motion vector estimation unit 110 and the motion compensation unit 114 synchronously perform the motion vector estimation operation and the motion compensation operation by using a slice of an image frame as an unit. The motion vector estimation unit 110 and the motion compensation unit 114 may be synchronized by using a synchronization signal transmitted between the motion vector estimation unit 110 and the motion compensation unit 114. Since the motion vector estimation unit 110 and the motion compensation unit 114 synchronously perform the motion vector estimation operation and the motion compensation operation by using the slice of the image frame as an unit, the motion vector estimation unit 110 and the motion compensation unit 114 only need to capture data required for performing the motion vector estimation operation and the motion compensation operation on the slice of the image frame from the shared storage unit 108 when performing the motion vector estimation operation and the motion compensation operation. Thus, data registers in the motion vector estimation unit 110 and the motion compensation unit 114 do not require a large storage capacity.

In other words, the motion estimation and motion compensation apparatus 106 of this embodiment only needs to store the image data of the $(t-1)^{th}$ frame and the image data of the $(t-2)^{th}$ frame in the shared storage unit 108, and share the stored data to the motion vector estimation unit 110 and the motion compensation unit 114. Namely, each of the motion vector estimation unit 110 and the motion compensation unit 114 may have a small storage space, and the requirement for performing the motion vector estimation operation and the motion compensation operation may still be satisfied. The conventional image processing apparatus does not include the shared storage unit 108 as in the embodiment of the invention, and does not perform the motion vector estimation operation and the motion compensation operation by using the slice of the image frame as an unit. Thus, the apparatus performing the motion vector estimation operation and the apparatus performing the motion compensation operation respectively require storage spaces to store a plurality of image frames. Therefore, compared with the conventional image processing apparatus, the image processing apparatus according to the embodiment of the invention requires a smaller storage space to perform the motion vector estimation operation and the motion compensation operation. Accordingly, the manufacturing cost may be effectively reduced.

Furthermore, the shared storage unit 108 according to an embodiment of the invention receives and stores the frame data captured from the storage unit 104 through the bus and shares the frame data to the motion vector estimation unit 110 and the motion compensation unit 114 that are also provided in the chip, unlike the conventional apparatus performing the motion vector estimation operation and apparatus performing the motion compensation operation directly capturing the frame data from an apparatus that stores the frame data through the bus. Thus, the image processing apparatus 100 according to the embodiment of the invention has a lower requirement on system bus bandwidth than that of the conventional technology. Accordingly, the memory bandwidth required for the technology of motion interpolation is effectively reduced.

It should be noted that, in some embodiments, the image data of the $t^{th}$ frame received by the motion vector estimation unit 110 are such as down-sampled image data, and the shared storage unit 108 may capture the image data of the $(t-2)^{th}$ frame from the storage unit 104 by down-sampling. Thus, the image data captured by the motion compensation unit 114 from the shared storage unit 108 is the image data of the down-sampled $(t-2)^{th}$ frame. In addition, the motion compensation operation may be performed based on the down-sampled $(t-2)^{th}$ frame. In addition, when the motion compensation unit 141 performs the motion compensation operation, frame data of the part excluding the halo defect area in the interpolated frames may mainly be obtained from the $(t-1)^{th}$ frame that is not down-sampled, while the halo compensation operation for the halo defect areas (e.g., the halo defect area H1 in the embodiment shown in FIG. 3) in the interpolated frames may be performed based on the down-sampled $(t-2)^{th}$ frame, so as to compensate for the halo defect. Since the compensation effect of halo defect compensation is limited, there is no significant difference between the compensation for the halo defect based on the down-sampled $(t-2)^{th}$ frame and the compensation for the halo defect based on the $(t-2)^{th}$ frame without down-sampling. Namely, performing the halo defect compensation operation by using the down-sampled $(t-2)^{th}$ frame does not significantly influence the quality of the interpolated frames. Performing the halo defect compensation operation by using the down-sampled $(t-2)^{th}$ frame may further reduce the requirement on storage space of the motion estimation and motion compensation apparatus 106 according to the embodiments of the invention. Namely, the capacity requirement on the registers of the shared storage unit 108 and the motion compensation unit 114 may be lowered.

Figure 4:
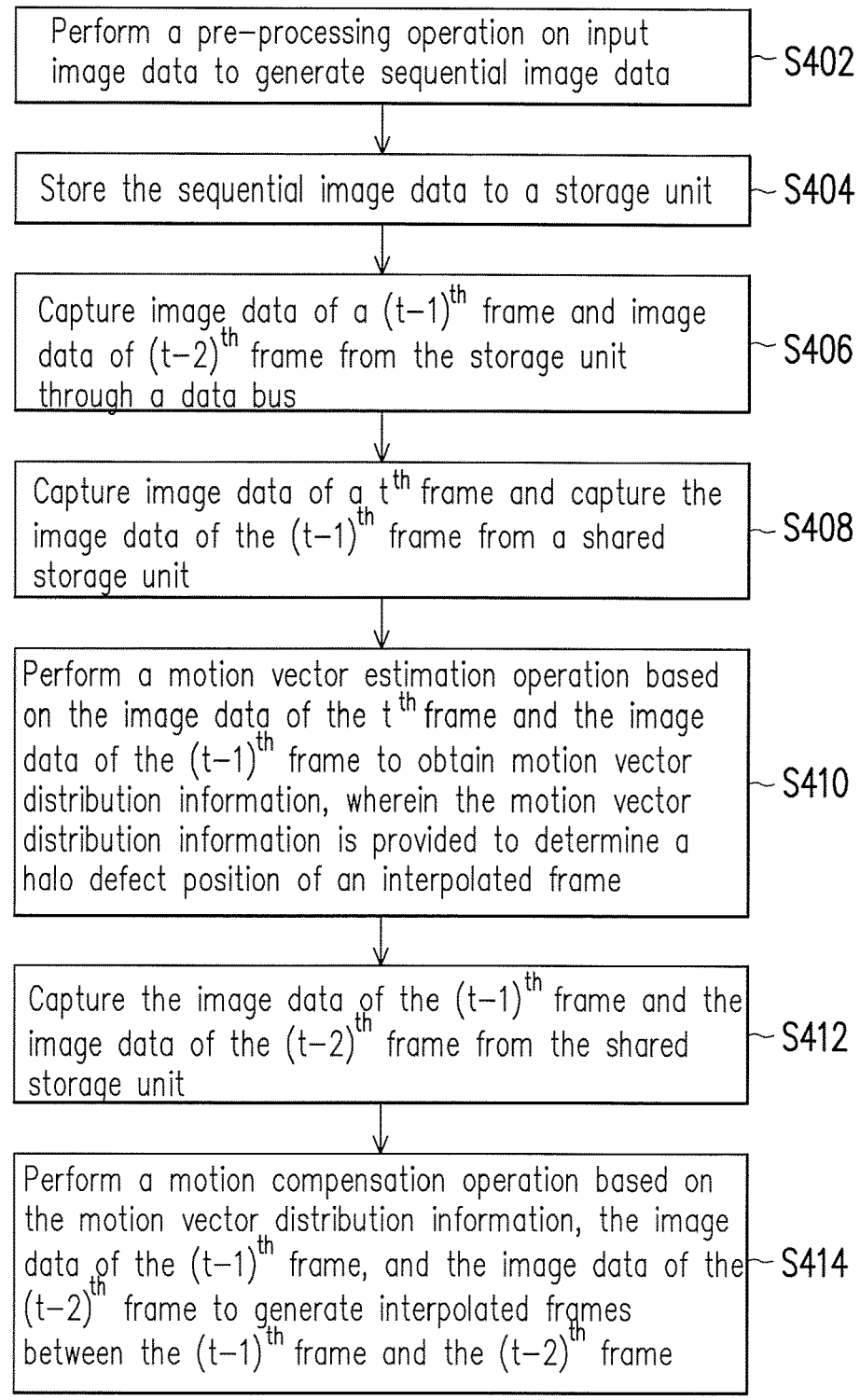
FIG. 4 is a schematic flowchart illustrating an image processing method of an image processing apparatus according to an embodiment of the invention.

FIG. 4 is a schematic flowchart illustrating an image processing method of an image processing apparatus according to an embodiment of the invention. Referring to FIG. 4, based on the above embodiments, the image processing method of the image processing apparatus includes steps as follows. First of all, the image pre-processing operation is performed on the input image data, so as to generate the sequential image data (Step S402). The image pre-processing operation may be an image process such as an image compression process or an edge detection process, etc. Then, the sequential image data are stored in the storage unit (Step S404). The storage unit may be implemented as a double data rate dynamic random access memory, for example. However, the invention is not limited thereto. Then, the image data of the $(t-1)^{th}$ frame and the image data of the $(t-2)^{th}$ frame are captured from the storage unit through the data bus (Step S406), wherein t is an integer greater than 2.

Then, the image data of the $t^{th}$ frame are captured, and the image data of the $(t-1)^{th}$ frame are captured from the shared storage unit (Step S408). Here, the shared storage unit may be implemented as a static random access memory, for example. However, the invention is not limited thereto. Then, the motion vector estimation operation is performed based on the image data of the $t^{th}$ frame and the image data of the $(t-1)^{th}$ frame, so as to obtain the motion vector distribution information. Here, the motion vector distribution information is provided to determine the halo defect positions of the interpolated frames (Step S410). Then, the image data of the $(t-1)^{th}$ frame and the image data of the $(t-2)^{th}$ frame are captured from the shared storage unit (Step S412). Lastly, the motion compensation operation is performed based on the motion vector distribution information, the image data of the $(t-1)^{th}$ frame, and the image data of the $(t-2)^{th}$ frame, so as to generate the interpolated frames between the $(t-1)^{th}$ frame and the $(t-2)^{th}$ frame (Step S414). Since the frame as basis for performing the motion vector estimation operation and the motion compensation operation are captured from the shared storage unit, the motion vector estimation operation and the motion compensation operation may be synchronously performed by using a slice of the image frame as an unit, such that the requirement on the system bus bandwidth for the image processing apparatus to perform frame interpolation may be effectively reduce, and the memory bandwidth required for motion interpolation is thus reduced.

In some embodiments, the image data of the $(t-2)^{th}$ frame may be captured from the storage unit by down-sampling in Step S406, and the down-sampled image data of the $(t-2)^{th}$ frame may serve as basis for the halo compensation operation. Thus, the storage space required for the motion estimation and motion compensation apparatus to perform the motion compensation operation may be effectively reduced without affecting the frame quality.

In view of the foregoing, the motion estimation and motion compensation apparatus according to the embodiments of the invention captures the frame data of the storage unit through the bus, then the motion vector estimation unit and the motion compensation unit capture the frame data required for the motion vector estimation operation and the motion compensation operation from the shared storage unit. Accordingly, the bus bandwidth required between the motion estimation and motion compensation apparatus and the storage unit when the motion vector estimation operation and the motion compensation operation are performed may be reduced. Also, the memory bandwidth required for the technology of motion interpolation may be reduced as well. Furthermore, the storage space requirement of the motion estimation and motion compensation apparatus may also be reduced. In some embodiments, the frame data as basis to perform the halo compensation operation may be captured by down-sampling, so as to further reduce the requirement of the motion estimation and motion compensation apparatus on storage space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing apparatus, comprising:
    a memory, receiving and storing sequential image data; and
    a motion estimation and motion compensation apparatus, coupled to the memory and performing motion estimation and motion compensation on the sequential image data to generate a plurality of interpolated frames, wherein the motion estimation and motion compensation apparatus comprises:
    a shared memory, coupled to the memory and capturing image data of a $(t-1)^{th}$ frame and image data of a $(t-2)^{th}$ frame from the memory through a data bus, wherein t is an integer greater than 2;
    a motion vector estimation circuit, coupled to the shared memory, receiving image data of a $t^{th}$ frame, capturing the image data of the $(t-1)^{th}$ frame from the shared memory, and performing a motion vector estimation operation based on the image data of the $t^{th}$ frame and the image data of the $(t-1)^{th}$ frame, so as to obtain motion vector distribution information;
    a halo detector, coupled to the motion vector estimation circuit, and determining a halo defect position of each of the interpolated frames based on the motion vector distribution information; and
    a motion compensation circuit, coupled to the motion vector estimation circuit and the halo detector, capturing the image data of the $(t-1)^{th}$ frame and the image data of the $(t-2)^{th}$ frame from the shared memory, and performing a motion compensation operation based on the motion vector distribution information, the image data of the $(t-1)^{th}$ frame and the image data of the $(t-2)^{th}$ frame, so as to generate the interpolated frames between the $(t-1)^{th}$ frame and the $(t-2)^{th}$ frame.

2. The image processing apparatus as claimed in claim 1, wherein the motion vector estimation circuit and the motion compensation circuit synchronously perform the motion vector estimation operation and the motion compensation operation by using a slice of an image frame as an unit.

3. The image processing apparatus as claimed in claim 1, wherein the shared memory captures the image data of the $(t-2)^{th}$ frame by down-sampling, such that the motion compensation circuit captures the image data of the down-sampled $(t-2)^{th}$ frame from the shared memory.

4. The image processing apparatus as claimed in claim 3, wherein the motion compensation circuit further performs a halo compensation operation based on the image data of the down-sampled $(t-2)^{th}$ frame, so as to compensate the halo defect of each of the interpolated frames.

5. The image processing apparatus as claimed in claim 3, wherein the image data of the $t^{th}$ frame are down-sampled image data.

6. The image processing apparatus as claimed in claim 1, further comprising:
    a pre-processing circuit, coupled to the memory and the motion vector estimation circuit and performing an image pre-processing operation on input image data, so as to generate the sequential image data.

7. The image processing apparatus as claimed in claim 1, wherein the memory is a dynamic random access memory, and the shared memory is a static random access memory.

8. An image processing method for an image processing apparatus, wherein the image processing apparatus comprises a memory and a motion estimation and motion compensation apparatus, and the motion estimation and motion compensation apparatus comprises a shared memory, the image processing method comprising:
    storing sequential image data in the memory;
    capturing image data of a $(t-1)^{th}$ frame and image data of a $(t-2)^{th}$ frame from the memory through a data bus;

capturing image data of a $t^{th}$ frame, and capturing the image data of the $(t-1)^{th}$ frame from the shared memory, wherein t is an integer greater than 2;

performing a motion vector estimation operation based on the image data of the $t^{th}$ frame and the image data of the $(t-1)^{th}$ frame, so as to obtain motion vector distribution information, wherein the motion vector distribution information is provided to determine halo defect positions of a plurality of interpolated frames;

capturing the image data of the $(t-1)^{th}$ frame and the image data of the $(t-2)^{th}$ frame from the shared memory; and performing a motion compensation operation based on the motion vector distribution information, the image data of the $(t-1)^{th}$ frame and the image data of the $(t-2)^{th}$ frame, so as to generate the interpolated frames between the $(t-1)^{th}$ frame and the $(t-2)^{th}$ frame.

9. The image processing method for the image processing apparatus as claimed in claim 8, comprising:

performing the motion vector estimation operation and the motion compensation operation by using a slice of an image frame as an unit.

10. The image processing method for the image processing apparatus as claimed in claim 8, further comprising:

capturing the image data of the $(t-2)^{th}$ frame from the memory by down-sampling as basis for performing the motion compensation operation.

11. The image processing method for the image processing apparatus as claimed in claim 10, comprising:

performing a halo compensation operation based on the image data of the down-sampled $(t-2)^{th}$ frame, so as to compensate for a halo defect of each of the interpolated frames.

12. The image processing method for the image processing apparatus as claimed in claim 8, further comprising:

performing an image pre-processing operation on input image data to generate the sequential image data.

13. The image processing method for the image processing apparatus as claimed in claim 8, wherein the memory is a dynamic random access memory, and the shared memory is a static random access memory.

* * * * *